United States Patent [19]
Olsen et al.

[11] Patent Number: 5,479,510
[45] Date of Patent: Dec. 26, 1995

[54] AUTOMATED DATA CARD PAYMENT VERIFICATION METHOD

[76] Inventors: Kurt B. Olsen, 1103 S. 16th St., Arlington, Va. 22202; Charles F. Olsen, 159 Williams Dr., Annapolis, Md. 21401; Stuart H. Kupinsky, 7008 Florida St., Chevy Chase, Md. 20815

[21] Appl. No.: 340,864
[22] Filed: Nov. 15, 1994
[51] Int. Cl.⁶ .................................................. H04L 9/32
[52] U.S. Cl. ................. 380/24; 380/22; 380/23; 380/25; 380/49; 235/379; 235/380; 340/825.31; 340/825.34; 379/91; 379/93
[58] Field of Search ................. 340/825.31, 825.34; 235/379, 380; 380/4, 22, 23, 24, 25, 49, 50; 379/91, 93, 95

[56] References Cited

U.S. PATENT DOCUMENTS

| | | | |
|---|---|---|---|
| 4,578,530 | 3/1986 | Zeidler | 380/24 |
| 4,656,342 | 4/1987 | Ugon | 235/379 |
| 4,733,060 | 3/1988 | Dono et al. | 235/379 |
| 4,734,564 | 3/1988 | Boston et al. | 235/380 |
| 4,755,940 | 7/1988 | Brachtl et al. | 340/825.34 X |
| 5,012,076 | 4/1991 | Yoshida | 235/379 |
| 5,144,115 | 9/1992 | Yoshida | 235/379 |

*Primary Examiner*—Bernarr E. Gregory

[57] ABSTRACT

A method of data transmission over existing telephone lines and later verification of that transmission includes electronic payment verification using telephone transmission of payment information and return transmission of a unique card account number, storage of the information and account number on a database and a data card through a data storage device, and verification of the infomation and account number at a later time by a separate data storage device and the same database.

4 Claims, 1 Drawing Sheet

AUTOMATED DATA CARD PAYMENT VERIFICATION METHOD

BACKGROUND OF THE INVENTION

Many if not most products and services are now available for purchase in advance by telephone, where the purchaser remits payment by simply communicating a credit card number or the like to the seller. When the purchased service is to be rendered at some later time, however, there are currently few efficient methods of communicating identifying information back to the purchaser for use by the seller in identifying that purchaser at the time of rendering service. Thus, for example, an airline will later mail pieces of printed paper constituting tickets identifiable by the airline. Such practices suffer from several disadvantages.

The purchaser does not have instant, presentable confirmation of the purchase, and must wait for the arrival of tickets, etc. Further, such tickets are costly, difficult to quickly replace if lost and are generally subject to easy forgery. More importantly, the verification of such tickets generally requires human! verification and collection of that information for the particular event or use. In addition, tickets or vouchers are often made of paper products that are not reusable by the seller such that the seller must constantly purchase products necessary to generate the ticket or voucher. Used tickets or vouchers also constitute environmental waste. Tickets and vouchers can be cumbersome and not easily stored by the purchaser.

It is the object of the present invention to arrive at an automated payment verification method which does not suffer from these disadvantages in time and cost.

DETAILED DESCRIPTION OF THE INVENTION

Figure 1:
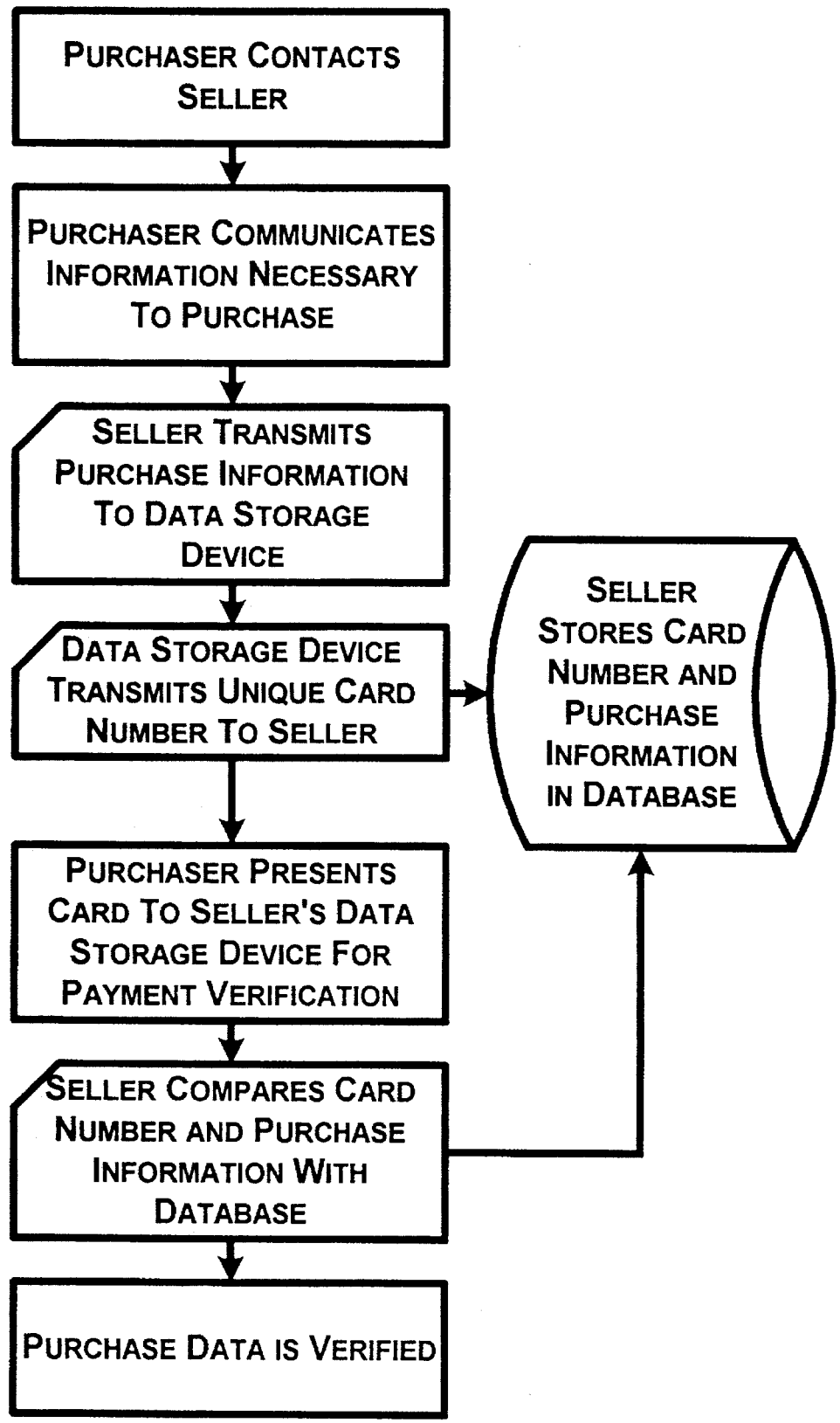
FIG. 1 is a flow-chart diagram of one embodiment of the present invention.

The invention is directed generally to a method of data transmission over existing telephone lines and later verification of that transmission. One, particular embodiment involves electronic payment verification using telephone transmission of verifiable information and a unique account number, storage of the information and account number on a data card, and verification of the account number and information at a later time.

In accordance with the invention, a purchaser communicates an intention to purchase products or services in advance of receipt or use of the products or services provided by a seller. This communication may take many known forms, such as calling the seller on a voice telephone line or a data telephone line. Payment for the product or service is proffered through use of known non-cash methods, such as credit or debit cards, electronic accounts, or the like.

The seller then transfers digitized information over the same or different telephone line to the purchaser. At the purchaser's location the digitized information is received by electronic signal reception, transmission, and data card storage devices, which are well known in the art. The purchaser places a reusable data card capable of storing the purchase information sent by the seller into the data card storage device. Data cards using magnetic or optical storage means are well known in the art. The signal reception device, such as a modem connected to a computer, receives the information transmitted by the seller. The data card storage device is used to transfer that information from the computer to, for example, a magnetic strip on the reusable data card. The information transmitted to the purchaser identifies the transaction with, for example, a purchase code, and indicates the specifics of the time, place, and/or other characteristics of the future event or use purchased. The purchase code identifies the transaction information to the seller.

The final step involves the transmission of a unique card account number, substantially permanently stored on the particular data card, and identifying that data card to the seller. The data card storage device may, for example, be capable of reading a separate magnetic strip on the card, which cannot be overwritten. This unique card account number later serves as a means for verifying the intended purchaser and what was purchased. One or more segments of data may be encrypted with known encryption algorithms to further protect against fraudulent use. In particular, the purchase information may be encrypted differently by each seller, without regard for the particular purchaser using the card.

The card itself is "universal" in that it can be used for any event or use no matter who the seller is. Each card, however, has a unique card account number as described above particularly identifying that card. The seller records the purchase information, including, for example, the purchase code, and the card account number into a central database at the time of purchase. The purchaser presents the card at the time the services are to be rendered to a data storage reader operated by the seller, and connected to the seller's database, to verify payment and any other information that the seller deems necessary. The unique card account number, stored by the seller in the database at the time of purchase, is then compared to the card account number read at the time of rendering services and to the purchase information to determine the veracity of the information and to identify the card holder as the purchaser. FIG. 1 depicts this method in flow chart form.

In addition, the seller or another can provide unmanned viewing or verification stations, allowing purchasers to use a stand-alone card reader to view or verify the purchase information, such as scheduling times, etc. Such stations may or may not be linked to the seller's central database.

The invention replaces all forms of tickets or vouchers now provided by a seller of services or products to be provided to the purchaser at a later time. An advantage of this system is that the seller will no longer have to employ a person to collect tickets or vouchers to an event or use. This task is replaced by the data storage reader which the purchaser places the universal card into to obtain access to the services or product. Second, tickets or vouchers could no longer be forged because the seller can now include a card account number along with the information written onto the card that would be read by the data storage reader connected to the seller's database containing all ticket or voucher information to verify the validity of payment. Third, sellers to an event or use will not have to constantly purchase materials necessary to manufacture tickets or vouchers. Fourth, if the purchaser loses the card he/she can call the seller, verify the previous purchase, and quickly replace the card with a new one electronically. Fifth, the card could be the same size as a standard credit card and thus would be much more convenient for the purchaser to carry. Sixth, the card would be universal and eliminate the variety of forms of tickets and vouchers now presently used. Lastly, since the transaction is conducted over the telephone lines, the purchaser can buy the ticket or voucher without leaving their home or place of business.

The following is an example of one embodiment of the present invention. An individual (the "purchaser") wishes to buy an airline ticket in advance of the flight. The purchaser contacts the airline via the telephone with the appropriate request for flight information and pays with a standard credit card over the phone. The purchaser then inserts a universal card capable of storing information sent by the seller into his personal data storage device. The card is the same size as an ordinary credit card. The airline transmits the appropriate information onto the purchaser's card, and receives the unique account number associated with that card. The information is recorded onto a database maintained by the airline along with the purchaser's account number designated by the card. If the purchaser loses the card before the flight, he can notify the airline, verify the previous purchase, and make arrangements for a replacement. The old information is immediately "flagged" by the airline so that if someone attempts to use the lost card the fraudulent use is immediately and electronically discovered. Once the purchaser arrives at the gate to board the aircraft, he places the card into a reader which verifies the validity of the information on the card permitting the purchaser to proceed if approved. No "ticket taker" is necessary.

Moreover, the method of the present invention also facilitates entities employing personnel in keeping track of travel costs more efficiently. The entity itself can maintain a database of data card information, the database being updated each time a data card is updated with new purchase information. Such an internal database facilitates accurate record keeping of business expenses.

Furthermore, the entity employing the inventive method may maintain a limited number of data cards designated for use by its personnel in, for example, traveling for business purposes. The seller, in recording the account information for that entity on its database, records all transactions specific to that entity. The seller can remit any multiple-use discounts such as "frequent flyer" discounts directly to the entity on a rolling basis, permitting the entity to take advantage of these discounts as it purchases tickets using the inventive method. Such a discount will therefore accrue to the entity, rather than the individual personnel, reducing the entity's travel expenditures. The identity of the particular individual receiving the business travel services is irrelevant, because all transactions are recorded and processed according to the unique card account numbers assigned to the entity.

It will be apparent that many modifications and variations may be effected without departing from the scope of the present invention's novel concepts.

We claim:

1. A method of digital data communication and verification between a first computer connected to a storage means storing digital data and a first data card storage device interfacing with a data card capable of storing data, and a second computer connected to a second data card storage device, comprising the steps of:

the first computer transmitting the digital data to the second computer;

the second computer transferring the digital data to the second data card storage device;

the second data card storage device recording the digital data onto a data card, reading a unique data card account number from the data card, and transferring the unique data card account number to the second computer;

the second computer communicating the unique data card account number to the first computer;

the first computer storing the unique data card account number on the storage mean in association with the digital data;

the first data card storage device subsequently reading the digital data and the unique data card account number from the data card, and transferring the digital data and the unique data card account number to the first computer; and the first computer comparing the digital data and the unique data card account number received from the first data card storage device to the digital data and the unique data card account number stored in the storage means.

2. The method of claim 1, wherein the first computer and the second computer communicate via a modem.

3. The method of claim 1, wherein the digital data includes identification of a payor of a sum certain and the sum certain.

4. The method of claim 3, wherein the digital data is encrypted.

* * * * *